Nov. 19, 1968  S. D. SHEFF  3,411,475

PRESSURE INDICATOR FOR LUBRICATION SYSTEMS

Filed Dec. 8, 1965

INVENTOR.
SANDER D. SHEFF
BY
*Lyon & Lyon*
ATTORNEYS

United States Patent Office 3,411,475
Patented Nov. 19, 1968

3,411,475
PRESSURE INDICATOR FOR LUBRICATION SYSTEMS
Sander D. Sheff, Los Angeles, Calif., assignor to Farr Company, El Segundo, Calif., a corporation of California
Filed Dec. 8, 1965, Ser. No. 512,348
2 Claims. (Cl. 116—70)

ABSTRACT OF THE DISCLOSURE

A pressure indication device for a lubrication system responds to an overpressure above a pre-selected limit to move an indicator to a fixed position to represent the overpressure condition.

---

This invention relates to pressure indicators for lubrication system, more particularly, but not limited to pressure indicators for internal combustion engines of large horsepower, such as diesel, locomotive and tractor engines.

Pressure lubrication systems serving internal combustion engines require filtration of the lubricant in order to remove dirt and other foreign particles, which, if permitted to remain, would cause excessive wear of the internal moving parts of the engine.

As the filter fills with dirt and particles, the pressure upstream of the filter increases and the pressure downstream thereof decreases until a condition is reached in which insufficient lubricant reaches the moving parts of the engine. This condition is compounded, should the filter rupture while subjected to excessive pressure and release some of the dirt and particles previously collected.

One procedure in order to prevent excessive filter loading is to subject the filter to periodic inspection. This is expensive and time consuming. Moreover, much depends on the judgement of the inspector.

Another procedure used particularly in the servicing of engines of a fleet of vehicles or the like, is to maintain a time or mileage check and change filters arbitrarily. However, the engines vary in performance and are not subjected to identical conditions so that some filters are replaced more frequently than needed and others are permitted to overload.

In most cases, the lubrication system includes a pressure gauge operative only when the engine is in operation. Often, because of the high vibration conditions associated with operation of an internal combustion engine, the relatively delicate pressure gauge is damaged and fails to function.

With the problem as outlined above in mind, an object of this invention is to provide an indicator which, when subjected to a predetermined pressure, will lock in its indicating position so that it may be readily observed when the engine is not in operation, as, for example, when it is being serviced with fuel and oil, and which also functions as a gauge when the engine is running to indicate lesser pressures.

A further object is to provide a pressure indicator which is inherently rugged so as to withstand the vibrations of an internal combustion engine and is arranged to be unaffected by transitory pressure surges.

A still further object is to provide a pressure indicator which is relatively compact and easily installed in a pressure system at the most advantageous location for ready inspection.

With the above and other objects in view as may appear hereinafter, reference is directed to the accompanying drawings, in which.

Figure 1:
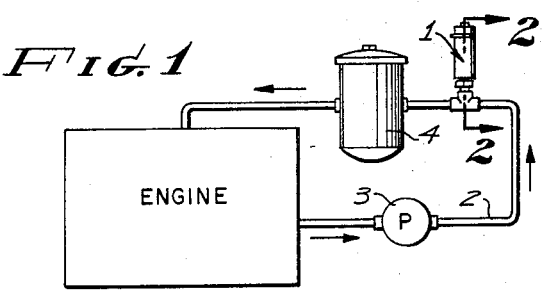
FIGURE 1 is a diagrammatical view showing a lubrication system and indicating the location of a pressure indicator when installed in the system.

The pressure indicator designated 1 is intended to be installed in a lubricant line 2 of an engine lubrication system between the discharge end of the pump 3 and the receiving end of the filter 4.

The pressure indicator includes a cylindrical body 5 having a first or lower bore or recess 6 in its lower end which is screwthreaded to receive a fitting for connection to the lubricant line. Held within the recess 6 by the fitting 7 is a sleeve 8 and clamped between the sleeve 8 and the fitting is an orifice plate 9 having a small orifice 10 therein.

Continuing from the recess 6 is a second bore or socket 11 of smaller diameter than the recess thereby providing a shoulder 12 at the inner end of the recess. Interposed between the sleeve 8 and the shoulder 12 is the peripheral portion of a rolling type diaphragm 13, the central portion of which is fastened to a plunger 14 by a retainer screw 15. The plunger is urged toward the fitting 7 by a spring 16 disposed in the socket 11.

The socket 11 is intersected at its inner end by a coaxial third bore 17 which is square or polygonal in cross section. The square bore 17 in turn communicates with an enlarged cylindrical forth or upper bore 18 continuing to the end of the body 5 opposite from the recess 6.

A square rod 19 is slidably, but non-rotatably received in the square bore 17 and is provided with a screwthreaded lower end 20 secured to the plunger 14. The opposite or upper end of the rod 19 is also screwthreaded as indicated by 21 and is joined to a cylindrical indicator head 22 slidable in the enlarged bore 18.

The indicator head 22 has an enlarged end 23 which extends to the upper end of body 5. On completion of the assembly of the indicator, it is desirable that the indicator head 22 be fixed against rotation with respect to the rod 19. This is accomplished by applying one or two drops of a liquid bonding material 24 to the internal threads of indicator head 22. The bonding material 24 penetrates the annular space between the mating threads of indicator head 22 and the screwthreaded upper end 21 of the rod 19, sets within a few minutes, and fixes the indicator head 22 to the rod 19. Prior to applying the bonding material, the indicator head 22 is adjusted by rotating the indicator head and thereby increasing or decreasing the force of spring 16.

Figure 2:
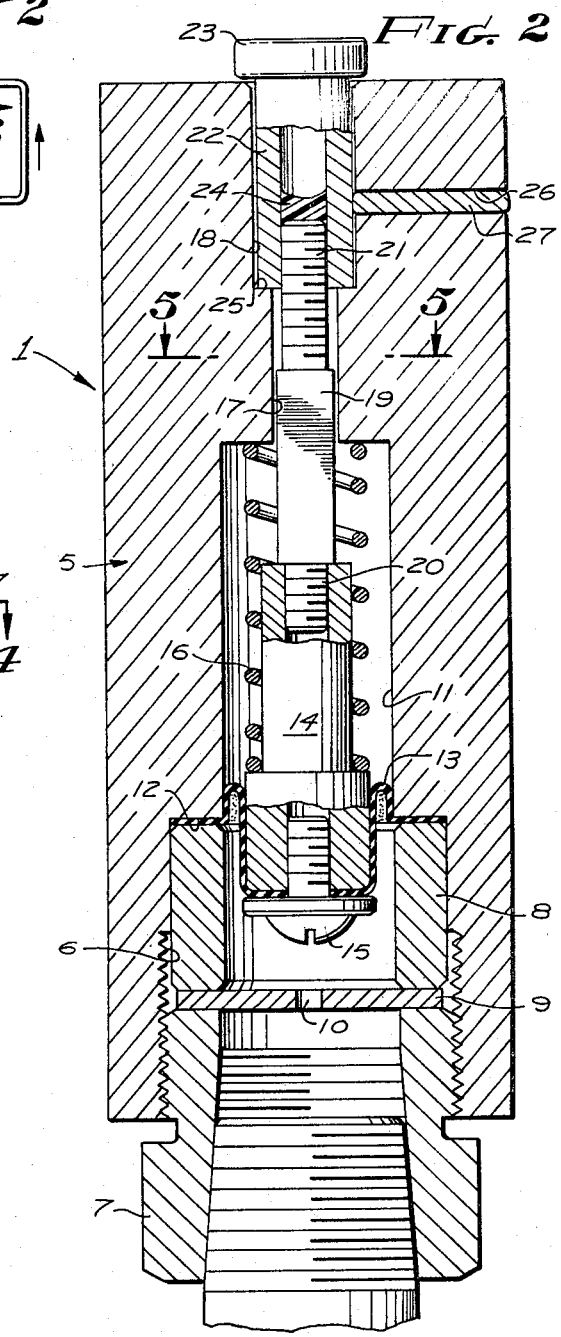
FIGURE 2 is an enlarged longitudinal sectional view of the pressure indicator shown in its normal condition when the engine is idle and the lubrication system is free of pressure.

The enlarged bore 18 forms with the bore 17 a shoulder 25 on which the inner end of the indicator head rests when in its retracted position shown in FIGURE 2.

The bore 18 is intersected by a side slot 26 in which is fitted a latch plate 27 capable of limited pivotal movement about the axis of a pin 28. A spring 29 urges the latch plate into the enlarged bore 18 unless restrained by the indicator head 22.

Operation of the pressure indicator is as follows:

When the indicator is installed in a lubrication system and subjected to the normal pressures therein, the indicator head 22 protrudes from the body 5 in proportion to the pressure exerted on the diaphragm 13 and plunger 14; that is, the fluid pressure urges the indicator head 22 outward, whereas the spring 16 tends to retract the indicator head 22.

Figure 3:
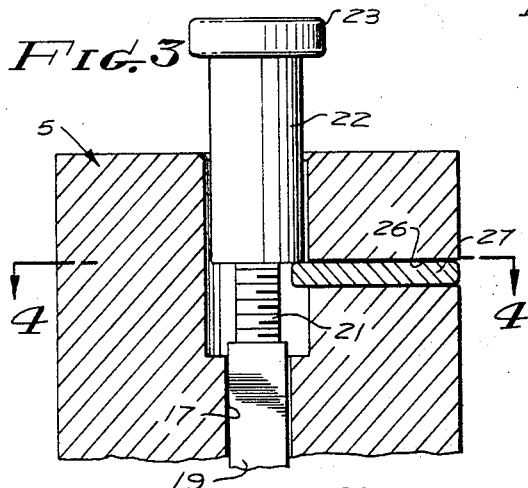
FIGURE 3 is a fragmentary sectional view showing the upper portion of the pressure indicator when locked in its indicating position.
Figure 4:
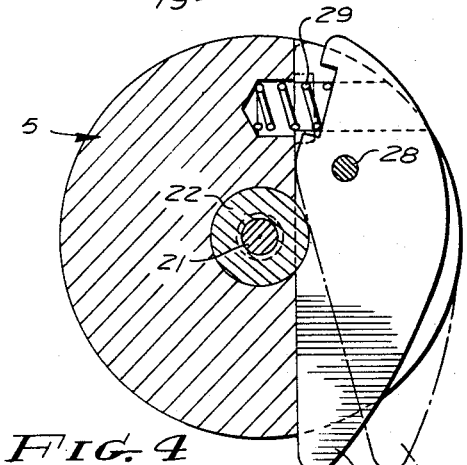
FIGURE 4 is a transverse sectional view taken through 4—4 of FIGURE 3.
Figure 5:
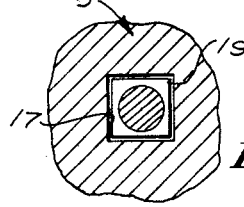
FIGURE 5 is a fragmentary transverse sectional view taken through 5—5 of FIGURE 2.

The force exerted by the spring and the effective area of the diaphragm 13 and the plunger 14 are so calculated that if the pressure in the lubrication system rises above some predetermined value, the lower end of the indicator head 22 will pass the side slot 26 so that the latch plate 27 may move inwardly as shown in FIGURES 3 and 4 so as to prevent return of the indicator head.

The pressure indicator is so located in the lubrication system as to be readily visible, at least when the engine is being serviced, so that the latched condition of the indicator head may be readily noticeable and serve to warn that the filter element should be replaced. When this is done, the latch plate 27 is moved manually to the broken line position shown in FIGURE 4 so as to release the indicator head. The indicator head may be colored in such a manner as to render it conspicuous.

Pressure surges often occur in engine lubricating systems. These pressure surges are transitory in nature. The orifice plate 9 serves to prevent such pressure surges from acting on the plunger 14 and cause undesirable movement of the indicator head to its latched position.

While a particular embodiment of this invention has been shown and described, it is not intended to limit the same to the details of the construction set forth, but instead, the invention embraces such changes, modifications and equivalents of the various parts and their relationships as come within the purview of the appended claims.

I claim:
1. A pressure indicator for lubrication systems, comprising:
   an elongated body having first, second, third and fourth bores;
   said first bore located at one end of said body;
   said second bore smaller in diameter than said first bore and continuing from said first bore forming a first shoulder therewith;
   said third bore having a polygonal cross-section smaller than said second bore and continuing from said second bore forming a second shoulder therewith;
   said fourth bore having a larger cross-section than said third bore and continuing from said third bore forming a third shoulder therewith;
   said body having a laterally disposed slot intersecting said fourth bore;
   a sleeve in said first bore;
   a fitting screwthreaded in said first bore to retain said sleeve therein;
   an orifice element clamped between said sleeve and fitting;
   a rolling diaphragm clamped between said sleeve and said first shoulder;
   a plunger carried by said diaphragm and forming with said diaphragm, sleeve and orifice element, a pressure chamber in communication with said flow line;
   a stem extending from said plunger through said polygonal third bore and retained against rotation thereby;
   a spring in said secondbore bearing on said second shoulder and urging said plunger in opposition to pressure in said pressure chamber;
   an indicator carried by said stem, slidable in said fourth bore, normally resting on said third shoulder, and adapted to protrude from said fourth bore to indicate the position of said plunger thereby to indicate the pressure in said chamber;
   a manually engageable lever disposed in said slot;
   said body having a transverse bore; and
   a biasing means mounted within said transverse bore and operably engaging said lever to urge said lever into bearing contact with said indicator and latching said indicator when said indicator is in the protruded position thereby to indicate a previously existing pressure in said chamber.

2. A pressure indicator used in a lubrication system to indicate an overpressure condition within the system, comprising:
   a cylindrical body having an upper bore and a lower bore;
   means connecting said body to a lubricant flow line to communicate fluid to said lower bore;
   an orifice mounted at the end of said body and restricting the flow of lubricant into said lower bore to prevent transitory pressure surges;
   a plunger mounted for axial movement within said body and having one end extending into said lower bore;
   a floating member mounted for axial movement within said body;
   means preventing leakage between said floating member and said body;
   said plunger, said floating member, said body, said orifice and said means defining a pressure chamber;
   resilient means operably positioned to exert a downward force on said floating member in opposition to pressure in said chamber;
   an indicator on the other end of said plunger, slidable in said upper bore and adapted to protrude from said upper bore when the pressure in said chamber acting on said floating member exceeds the downward force of said resilient means on said floating member thereby indicating the pressure in said chamber;
   said body having a slot intersecting said upper bore;
   a manually releasable lever pivotably mounted within said slot;
   means urging said lever into said upper bore and normally into a bearing contact with said indicator; and
   means on said indicator to receive said lever when said indicator has protruded from said upper bore a predetermined distance thereby preventing retraction of said indicator.

References Cited

UNITED STATES PATENTS

| | | | |
|---|---|---|---|
| 2,618,977 | 11/1962 | Hottenroth | 73—409 |
| 2,843,077 | 7/1958 | Tielfer | 116—117 |
| 3,064,618 | 11/1962 | Scavuzzo | 116—70 |
| 3,145,570 | 8/1964 | Grandstaff | 73—419 |
| 3,203,246 | 8/1965 | Horwitt et al. | 73—419 |

LOUIS J. CAPOZI, *Primary Examiner.*